United States Patent
Fedan

(10) Patent No.: US 6,362,466 B1
(45) Date of Patent: Mar. 26, 2002

(54) OPTICAL OBJECT DETECTION HAVING CIRCUITRY APPLYING LOGARITHMIC FUNCTION TO THE AVERAGE OF FILTERED OUTPUT

(76) Inventor: Orest Fedan, 22 Betts Rd., Belmont, MA (US) 02478

( * ) Notice: Subject to any disclaimer, the term of this patent is extended or adjusted under 35 U.S.C. 154(b) by 0 days.

(21) Appl. No.: 09/418,712

(22) Filed: Oct. 15, 1999

(51) Int. Cl.[7] .......................... H01J 40/14; G01V 9/04; G08B 13/18
(52) U.S. Cl. .................... 250/214 L; 250/221; 340/555
(58) Field of Search .......................... 250/221, 222.1, 250/214 L, 214 C, 214 B; 340/555–557

(56) References Cited

U.S. PATENT DOCUMENTS

| | | | |
|---|---|---|---|
| 4,536,687 A | | 8/1985 | Kurihara et al. ............ 318/480 |
| 4,567,347 A | * | 1/1986 | Ito et al. ..................... 250/202 |
| 4,569,588 A | * | 2/1986 | Nishiwaki et al. ......... 356/28.5 |
| 4,633,077 A | * | 12/1986 | Ikari et al. ................ 250/214 L |
| 4,973,837 A | * | 11/1990 | Bradbeer ..................... 250/221 |
| 5,055,840 A | | 10/1991 | Bartlett ......................... 341/31 |
| 5,510,766 A | * | 4/1996 | Harman et al. ............. 340/552 |
| 5,585,625 A | | 12/1996 | Spies ........................... 250/221 |
| 5,585,626 A | | 12/1996 | Beck et al. ............... 250/222.1 |
| 5,917,425 A | * | 6/1999 | Crimmins et al. ..... 340/825.49 |

* cited by examiner

*Primary Examiner*—Stephone B. Allen

(57) ABSTRACT

An object detector which illuminates an area with a pulsating beam of light and measures light reflected back by an object in the beam. The light source is chopped by three different chopping frequencies. The light detector uses the highest frequency to reject out of band ambient signals and noise, uses the middle frequency for synchronously detecting the reflected signal, and uses the lowest frequency to ratio the output to the noise floor. The light detector uses linear gain prior to filtering out of band ambient signals to avoid intermodulation effects. The light detector uses logarithmic gain after the filtering to avoid overload and transient effects, without requiring an automatic level control circuit.

12 Claims, 2 Drawing Sheets

OPTICAL OBJECT DETECTION HAVING CIRCUITRY APPLYING LOGARITHMIC FUNCTION TO THE AVERAGE OF FILTERED OUTPUT

BACKGROUND

The invention relates to optical object detection.

Typical optical object detectors illuminate an area with light, usually in the infra-red region of the light spectrum. Any object entering the illuminated area will reflect some of the light. A photodetector circuit detects the reflected light. If the object is larger than a minimum size, the detected signal exceeds a threshold and causes an output signal to be generated indicating the object's presence. To detect as small an object as possible at the greatest distance possible, the photodetector circuit must be as sensitive as possible. There are three main ways to increase the sensitivity of the photodetector circuit:

1. Increase the signal to noise ratio of the signal resulting from the intended light source being reflected by the object.

2. Reduce the effect of interfering signals resulting from non-intended light sources directly entering the photodetector.

3. Reduce the effects of drift mechanisms, such as temperature fluctuations, on the detection threshold.

Non-intended light sources form a varying ambient signal in the photodetector circuit. The desired signal (due to the intended illuminating light source, reflected by the object) rides on top of this ambient signal. As the ambient signal increases, it causes more current to flow in the photodetector. The increased current results in increased detector noise. This is called detector noise floor modulation. For maximum sensitivity, the threshold that the desired signal must overcome is set as low as possible. Both the ambient signal and the increased noise resulting from it force the threshold to be increased, thus reducing sensitivity. Also, as the ambient signal increases, it causes the desired signal to decrease due to non-linear effects in the photodetector. This is called detector saturation. This reduces the signal to noise ratio of the desired signal, again reducing sensitivity.

Many techniques have been used to improve sensitivity. One such technique is to chop the intended illuminating light source at a fixed frequency (called the carrier frequency) and filter the intended signal from the photodetector to pass only this frequency. This technique rejects all ambient signals outside the bandwidth of the carrier filter. It also increases the signal to noise ratio of the desired signal by rejecting the noise outside the bandwidth of the carrier filter. An extension of this technique is to use synchronous detection. Synchronous detection rejects ambient signals and noise that are not in phase with the carrier frequency, by using a product detector instead of a diode detector. Synchronous detectors require the carrier frequency signal to be routed into the detector circuitry for the purpose of product detection. The carrier frequency signal must be very well isolated from the optical signal amplifier otherwise the routed signal will swamp the optical detected signal. Such high isolation increases product cost. This carrier frequency filtering technique and its synchronous detection extension do not reduce the effects of detector noise floor modulation or detector saturation caused by ambient signals within the bandwidth of the carrier filter. Since higher frequency ambient signals have lower amplitudes, a higher carrier frequency will reduce the effects of ambient signals. But since photodetector preamp noise increases with frequency, a higher carrier frequency decreases the signal to noise ratio of the desired signal. Thus, there is an optimum carrier frequency.

Another technique is to incorporate an automatic level control (ALC) in the photodetector circuit. The ALC maintains the peak of the detected signal at a fixed amplitude by varying the gain of an amplifier. This technique reduces the effects of ambient signal, including detector noise floor modulation, but only if the ambient signal varies at a rate slower than the response time of the ALC. The response time of the ALC must be slower than the carrier period (carrier period is the inverse of the carrier frequency), otherwise the desired signal amplitude will be reduced. The ALC also prevents the photodetector amplifier from being saturated by too strong a signal (saturation is a common problem due to the high gain required for sensitive detection). The ALC can also help reduce the effects of drift mechanisms on the detection threshold.

Other techniques which prevent amplifier saturation due to strong ambient signals are electrical ambient cancellation circuitry and optical filtering. The former cancels ambient signals at signal frequencies below the carrier frequency at the input of the preamp rather than at the output (this is done by negative feedback). The latter (optical filtering) is a window or an encasement around the photodetector which filters out all optical energy outside a bandwidth centered around the infra-red radiation frequency of the intended light source.

Finally, temperature compensation techniques reduce the effects of temperature on the detection threshold, allowing the threshold to be set closer to the noise floor.

OBJECTS AND ADVANTAGES

My optical object detector uses a low gain linear photodetector preamplifier. The gain of the preamplifier is low enough to prevent saturation of the preamplifier output by strong ambient signals, but high enough to maintain good signal to noise ratio. The preamplifier output signal is filtered by a carrier band pass filter to filter out ambient signals and noise which are outside the bandwidth of the carrier filter. The output signal of the carrier filter is detected by a sensitive multistage logarithmic detector instead of a diode junction. Such a detector is typically the signal strength output of an intermediate frequency amplifier/demodulator integrated circuit (the normal demodulator output of the integrated circuit is not used).

The illuminating LED is chopped at three different frequency rates. The high frequency chopping rate is the carrier frequency. The medium frequency chopping rate is used to synchronously detect the illuminating signal reflected from an object and detected by the photodetector circuit. The low frequency chopping rate is used to give the photodetector circuit a noise reference to compare to (when the LED is not emitting light), so that the photodetector circuit can produce an output signal which is indicative of the signal to noise ratio of the signal resulting from the reflected light rather than just the amplitude of the signal compared to a fixed voltage level. The carrier frequency could also be used for synchronous detection, but this would be more expensive due to the high isolation required between the carrier signal and the preamp input circuit.

DRAWING FIGURES

DESCRIPTION

Figure 1:
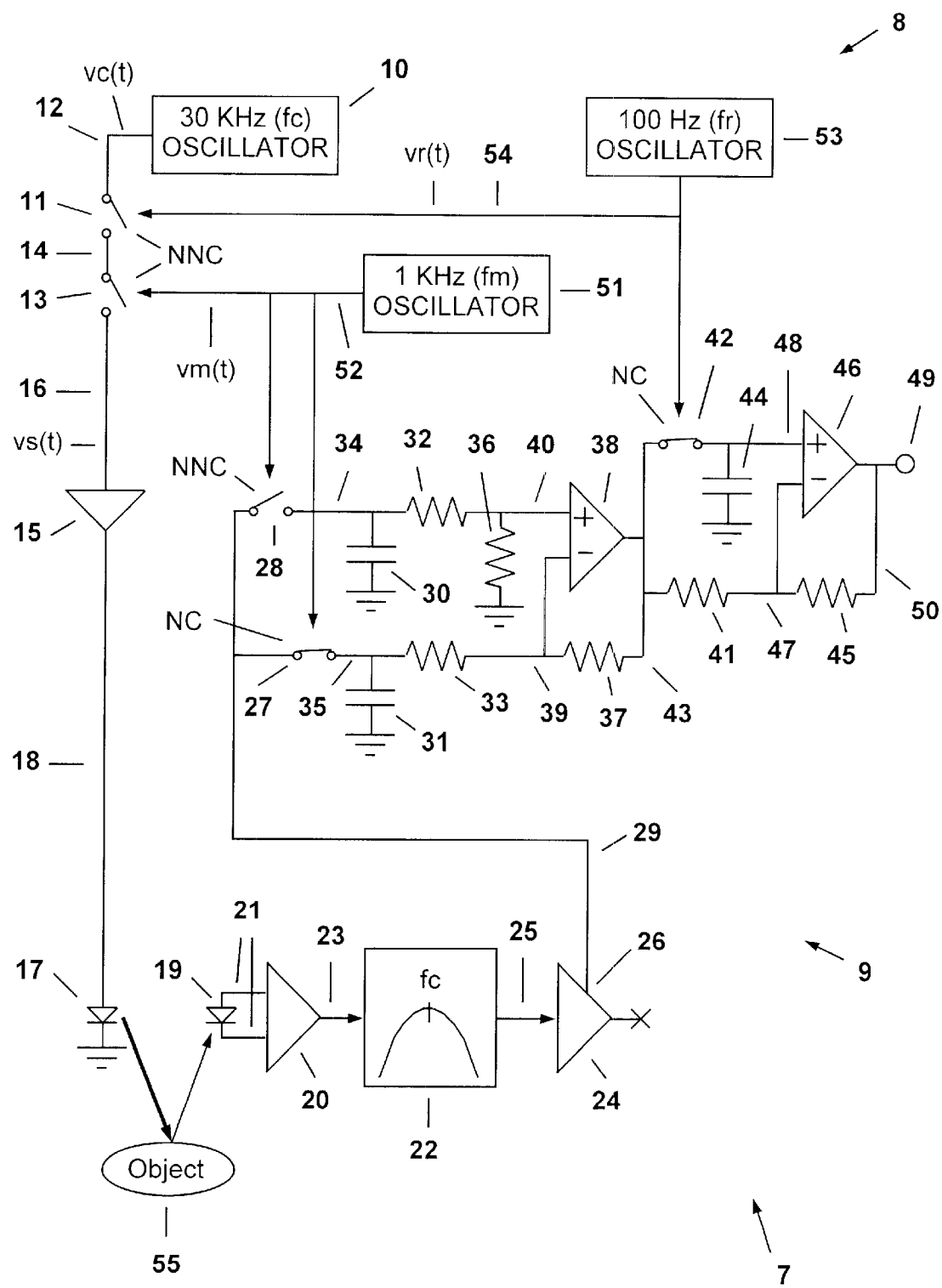
FIG. 1 is a schematic circuit diagram of a circuit constructed according to one aspect of the invention.

FIG. 1 shows an object detector circuit 7 constructed according to the invention. Generally, it includes a light source circuit 8 and a light receiver circuit 9.

A high frequency oscillator 10 is connected to one side of a switch 11 by a line 12. The other side of switch 11 is connected to one side of a switch 13 by a line 14. The other side of switch 13 is connected to the input of a power amplifier 15 by a line 16. The output of the power amplifier is connected to one side of an LED (light emitting diode) 17 by a line 18. The other side of the LED is connected to the circuit reference ground.

A photodetector 19 is connected to the input of a low noise linear preamplifier 20 by a line 21. The output of the preamplifier connects to the input of a band pass filter 22 by a line 23. The output of the band pass filter connects to the input of an IF (intermediate frequency) amplifier 24 by a line 25. The IF amplifier has a multi-stage logarithmic signal strength detector. The signal strength output 26 of the IF amplifier is connected to one side of a switch 27 and one side of a switch 28 by a line 29. The other side of switch 28 is connected to one side of a capacitor 30 and to one side of a resistor 32 by a line 34. The other side of capacitor 30 is connected to the circuit reference ground. The other side of resistor 32 is connected to one side of a resistor 36 and the positive input of an op amp 38 by a line 40. The other side of resistor 36 is connected to the circuit reference ground. The other side of switch 27 is connected to one side of a capacitor 31 and one side of a resistor 33 by a line 35. The other side of capacitor 31 is connected to the circuit reference ground. The other side of resistor 33 is connected to one side of a resistor 37 and the negative input of op amp 38 by a line 39. The other side of resistor 37 is connected to the output of op amp 38 and to one side of resistor 41 and to one side of switch 42 by a line 43. The other side of switch 42 is connected to one side of a capacitor 44 and the positive input of an op amp 46 by a line 48. The other side of capacitor 44 is connected to the circuit reference ground. The other side of resistor 41 is connected to one side of resistor 45 and to the negative input of op amp 46 by a line 47. The other side of resistor 45 is connected to the output of op amp 46 and to the circuit output 49 by a line 50.

A medium frequency oscillator 51 is connected to a line 52. A low frequency oscillator 53 is connected to a line 54.

Typically, all resistors except 41 and 45 would have the same value. Resistor 41 would typically have a value of 100 kilo-Ohms and resistor 45 would typically have a value of 500 kilo-Ohms. Capacitors 30 and 31 would typically have a value of 1000 pico-Farads and capacitor 44 would typically have a value of 1 micro-Farad.

Operation

Oscillator 51 produces a signal vm(t) on line 52. Signal vm(t) closes and opens switches 13, 27, and 28 at a frequency rate of fm, such that whenever switch 13 is closed, switch 28 is also closed but switch 27 is open, and whenever switch 13 is open, switch 28 is also open but switch 27 is closed. Oscillator 53 produces a signal vr(t) on line 54. Signal vr(t) closes and opens switches 11 and 42 at a frequency rate of fr, such that whenever switch 11 is closed, switch 42 is open, and vice versa. Oscillator 10 produces a signal vc(t) on line 12. When both switches 11 and 13 are closed, signal vs(t) on line 16 is the same as signal vc(t) and causes LED 17 to emit light energy in pulses which occur at a frequency rate of fc. This is the intended light energy.

If an object 55 is present in the area illuminated by the LED light energy, the object reflects some of the light energy back to photodetector 19. The resulting signal from the photodetector is amplified by preamplifier 20 and filtered by filter 22. IF amplifier 24 amplifies the signal from filter 22 and detects it, producing a signal on line 29 which is proportional to the logarithm of the peak absolute value of the amplified signal. The logarithmic relationship holds over a very wide range of signal levels because the signal strength detector inside amplifier 24 is composed of many sections of diode detectors with a crossover addition circuit.

Switch 28, being closed, charges capacitor 30 to a voltage which is indicative of the detected light energy during the period when the LED is emitting light. When switch 13 is open, no light energy is emitted by LED 17. Switch 27, now being closed, charges capacitor 31 to a voltage which is indicative of the noise level on line 29. Op amp 38, being configured as a differential amplifier, produces a noise ratioed signal on line 43 which is proportional to the ratio of the signal on line 29 when the LED is emitting light to the noise on line 29 when the LED is not emitting light. When switch 11 is closed, switch 42 is open and the noise ratioed signal on line 43 is amplified by op amp 46. When switch 11 is open, LED 17 does not emit any light regardless of the state of switch 13. During this time, switch 42 is closed and capacitor 44 charges to a voltage which is indicative of the noise level on line 43. If not for circuit offsets, this voltage would be 0 volts. Op amp 46, being configured as a differential amplifier, thus only amplifies the deviation from the noise. It is important to cancel circuit offsets in this way, because op amp 46 has high gain for maximum detection sensitivity. The voltage at output 49, when filtered, is indicative of how much light energy has been reflected back by an object in the illuminated area.

For sensitive detection, conventional object detectors use a low detection threshold. This also lessens the requirements on their ALC circuit by providing more dynamic range so the ALC does not need to be activated as often. But if the threshold is too low, it will be affected by noise modulation due to strong ambient signals and it will be too temperature sensitive. Therefore, it will need to be temperature compensated and frequently adjusted. The ALC circuit, being susceptible to transients, will also limit how low a threshold can be used.

Since my object detector circuit provides an output which is ratioed to the noise floor instead of a signal level, it is insensitive to temperature and noise floor modulation effects. Therefore, the detection threshold at output 49 can be fixed and never needs adjustment. The actual threshold can be set at any value since circuit gain can be adjusted so that noise produces an output just below the threshold when no objects are in the illuminated area. As the noise floor changes due to ambient signals, temperature effects, aging, etc., the signal at output 49 will remain unchanged and just below the detection threshold as long as there is no object in the illuminated area. Thus maximum sensitivity is preserved without the need for recalibration.

The preamplifier being linear, does not translate ambient signals from outside the carrier filter bandwidth to inside the carrier filter bandwidth. The preamplifier gain can be kept to a low transconductance value of only 100,000 (thus preventing saturation) because the following stage, IF amp 24, is a very sensitive, low noise amplifier. The wide dynamic range of 10,000 (80 decibels) of the amplifier and logarithmic detector in IF amp 24 insures that the photodetector circuit never saturates, even in broad daylight, and without requiring an ALC circuit.

The synchronous detection performed by switches 27 and 28 and capacitors 30 and 31 improves the signal to noise ratio by rejecting out of phase ambient signals and noise. Because the synchronizing signal is not the carrier (fc) but rather a modulation of the carrier (fm), it cannot couple into the highly sensitive high gain preamp 20 and associated circuitry. Thus there are no costly signal isolation requirements.

Setting the object detection threshold to be a predetermined signal to noise ratio (noise ratiometric) rather than a predetermined signal level reduces noise modulation effects caused by all ambient signals (even those inside the carrier filter bandwidth) without requiring an ALC circuit. A noise ratiometric detection threshold also eliminates the effects of temperature and other drift mechanisms on the detection threshold since no stable absolute voltage reference level is required.

Not requiring an ALC circuit, my object detector is not susceptible to saturation and other effects due to transients. Thus, maximum sensitivity is not only preserved in broad daylight, but also in a fast moving vehicle that moves quickly into and out of shady areas.

Alternative Embodiments

Figure 2:
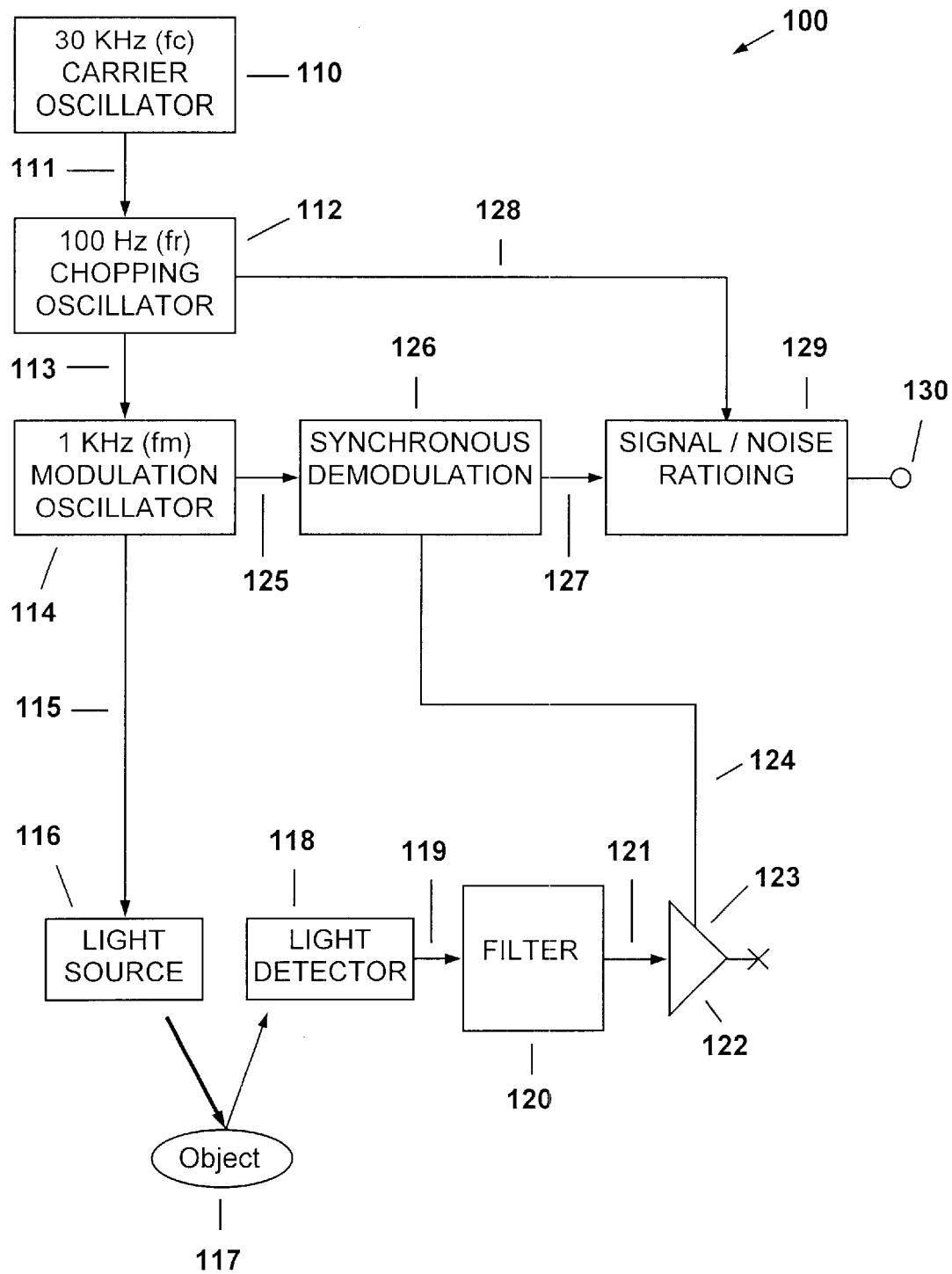
FIG. 2 is a schematic circuit diagram of a circuit constructed according to another aspect of the invention.

Other switching circuits can be constructed according to the invention. Modifications and combination circuits can be made by one of ordinary skill in the art without necessarily departing from the spirit and scope of the invention. For example, FIG. 2 shows an object detector circuit 100 constructed according to the invention. Generally, it includes a carrier oscillator 110, a chopping oscillator 112, a modulation oscillator 114, a light source 116, a light detector 118, a filter 120, a logarithmic amplifier 122, a synchronous demodulator 126, and a signal to noise ratioing circuit 129. The carrier oscillator is connected to the chopping oscillator by a line 111. The chopping oscillator is connected to the modulation oscillator by a line 113 and to circuit 129 by a line 128. The modulation oscillator is connected to the light source by a line 115 and to circuit 126 by a line 125. The light detector is connected to the filter by a line 119. The other side of the filter is connected to amplifier 122 by a line 121. The logarithmic detection output 123 of amplifier 122 is connected to synchronous demodulator 126 by a line 124. Synchronous demodulator 126 is connected to circuit 129 by a line 127. Circuit 129 has an output node 130.

Oscillators 110, 112, and 114 modulate light source 116. Light originating from the light source and reflected by an object 117 is detected by detector 118, filtered by filter 120, and logarithmically detected by amplifier 122. Circuit 126 synchronously demodulates the logarithmically detected output signal by multiplying it with a signal from the modulation oscillator. Circuit 129 ratioes the resulting signal by comparing it to the noise floor when a signal from the chopping oscillator disables light source 116, and provides the ratioed output at output node 130.

Other object detector circuits can be made by omitting circuit blocks from FIG. 2. For example, circuit 129 and chopping oscillator 112 can be omitted. As another example, circuit 126 and modulation oscillator 114 can be omitted. As yet another example, all four circuits 112, 114, 126, and 129 can be omitted. As still another example, synchronous demodulator 126 can use the carrier oscillator instead of the modulation oscillator with which to form the demodulation product.

Other object detectors can also be made by modifying the circuit blocks in FIG. 2. For example, filter 22 in FIG. 1 and filter 120 in FIG. 2 can be either a band pass filter which passes signals only at the carrier frequency or a high pass filter which passes signals at the carrier frequency or higher frequencies.

Other object detectors can also be made by adding circuit elements. For example, in FIG. 1, a buffer amplifier can be added between switch 28 and capacitor 30 and between switch 27 and capacitor 31.

CONCLUSION, RAMIFICATIONS, AND SCOPE

The use of a wide dynamic range logarithmic amplifier/detector following a linearly amplified and filtered signal greatly reduces ambient effects while preventing saturation in strong ambients. Synchronous detection at a modulation frequency rate (rather than at the carrier frequency rate) greatly increases signal to noise without introducing a signal isolation cost penalty. Ratioing the output to the noise floor further reduces ambient effects and greatly reduces drift mechanisms.

Although the description above contains many specifities, these should not be construed as limiting the scope of the invention, but as merely providing illustrations of some of the preferred embodiments of this invention. Thus the scope of the invention should be determined by the appended claims and their legal equivalents, rather than by the examples given.

I claim:

1. An object detector circuit comprising:
   a source of light modulated by a carrier at a frequency, for illuminating an object;
   a detector configured to convert light that originates at the source and is reflected from the object, into an electrical signal; and
   circuitry connected to process the electrical signal to produce a derived signal by filtering at the carrier frequency and applying a logarithmic function to the average energy of the result of the filtering.

2. An object detector circuit as recited in claim 1, further including:
   a chopping oscillator coupled to said light source, for disabling said light source in a series of cycles at a chopping frequency rate;
   wherein said chopping frequency rate is less than said carrier frequency rate; and
   a ratio circuit coupled to respond to said derived signal and a clock signal from said chopping oscillator, said clock signal having a fixed phase relationship to said chopping frequency;
   said ratio circuit producing a ratioed signal by forming the difference of said derived signal when said chopping oscillator has disabled the light source to said derived signal when said chopping oscillator has not disabled the light source.

3. An object detector circuit as recited in claim 1, further including:
   a synchronous demodulator coupled to respond to said derived signal and a clock signal from said carrier oscillator, said clock signal having a fixed phase relationship to said carrier frequency;
   said synchronous demodulator producing a demodulated signal by forming a product of said clock signal and said derived signal.

4. An object detector circuit as recited in claim 3, further including:
   a chopping oscillator coupled to said light source, for disabling said light source in a series of cycles at a chopping frequency rate;
   wherein said chopping frequency rate is less than said carrier frequency rate; and
   a ratio circuit coupled to respond to said demodulated signal and a second clock signal from said chopping oscillator, said second clock signal having a fixed phase relationship to said chopping frequency;
   said ratio circuit producing a ratioed signal by forming the difference of said demodulated signal when said chopping oscillator has disabled the light source to said demodulated signal when said chopping oscillator has not disabled the light source.

5. An object detector circuit as recited in claim 1, further including:
- a modulation oscillator coupled to said light source, for disabling said light source in a series of cycles at a modulation frequency rate, said modulation frequency rate being distinct from said carrier frequency rate; and
- a synchronous demodulator coupled to respond to said derived signal and a clock signal from said modulation oscillator, said clock signal having a fixed phase relationship to said modulation frequency;
- said synchronous demodulator producing a demodulated signal by forming a product of said clock signal and said derived signal.

6. An object detector circuit as recited in claim 5, further including:
- a chopping oscillator coupled to said light source, for disabling said light source in a series of cycles at a chopping frequency rate;
- wherein said chopping frequency rate is less than said modulation frequency rate and said carrier frequency rate; and
- a ratio circuit coupled to respond to said demodulated signal and a second clock signal from said chopping oscillator, said second clock signal having a fixed phase relationship to said chopping frequency;
- said ratio circuit producing a ratioed signal by forming the difference of said demodulated signal when said chopping oscillator has disabled the light source to said demodulated signal when said chopping oscillator has not disabled the light source.

7. A method of optically detecting an object, comprising:
- providing a light source and a light detector;
- modulating said light source by a carrier at a frequency;
- illuminating said object with said light source;
- converting light that originates at said light source and is reflected from said object, into an electrical signal;
- producing a derived signal by filtering said electrical signal at the carrier frequency and applying a logarithmic function to the average energy of the result of the filtering.

8. A method as recited in claim 7, further comprising:
- disabling said light source in a series of cycles at a chopping frequency rate, said chopping frequency rate being lower than said carrier frequency rate; and
- producing a ratioed signal by forming the difference between said derived signal when said light source is disabled and said derived signal when said light source is not disabled.

9. A method as recited in claim 7, further comprising:
- synchronously demodulating said derived signal to produce a demodulated signal by forming a product of a clock signal and said derived signal, said clock signal having a fixed phase relationship to said carrier frequency.

10. A method as recited in claim 9, further comprising:
- disabling said light source in a series of cycles at a chopping frequency rate, said chopping frequency rate being lower than said carrier frequency rate; and
- producing a ratioed signal by forming the difference between said demodulated signal when said light source is disabled and said demodulated signal when said light source is not disabled.

11. A method as recited in claim 7, further comprising:
- disabling said light source in a series of cycles at a modulation frequency rate, said modulation frequency rate being distinct from said carrier frequency rate; and
- synchronously demodulating said derived signal to produce a demodulated signal by forming a product of a clock signal and said derived signal, said clock signal having a fixed phase relationship to said modulation frequency.

12. A method as recited in claim 11, further comprising:
- disabling said light source in a series of cycles at a chopping frequency rate, said chopping frequency rate being lower than said modulation frequency rate and said carrier frequency rate; and
- producing a ratioed signal by forming the difference between said demodulated signal when said light source is disabled and said demodulated signal when said light source is not disabled.

* * * * *